June 30, 1964
W. M. GREAVES
3,139,173
CONVEYOR ELEVATOR
Filed Aug. 20, 1962
3 Sheets-Sheet 1
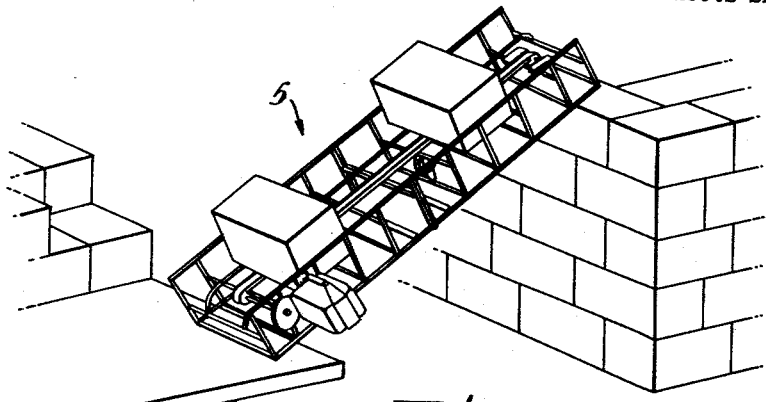
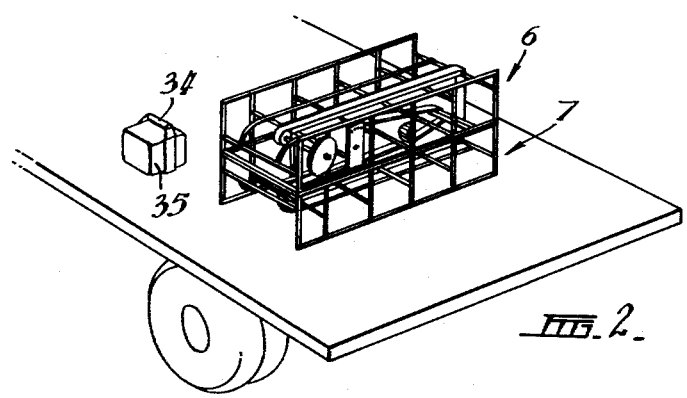
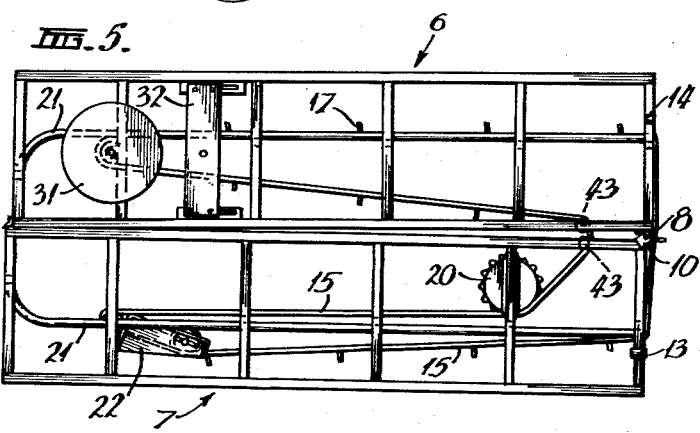
INVENTOR
WALTER MALCOLM GREAVES
BY
ATTORNEY

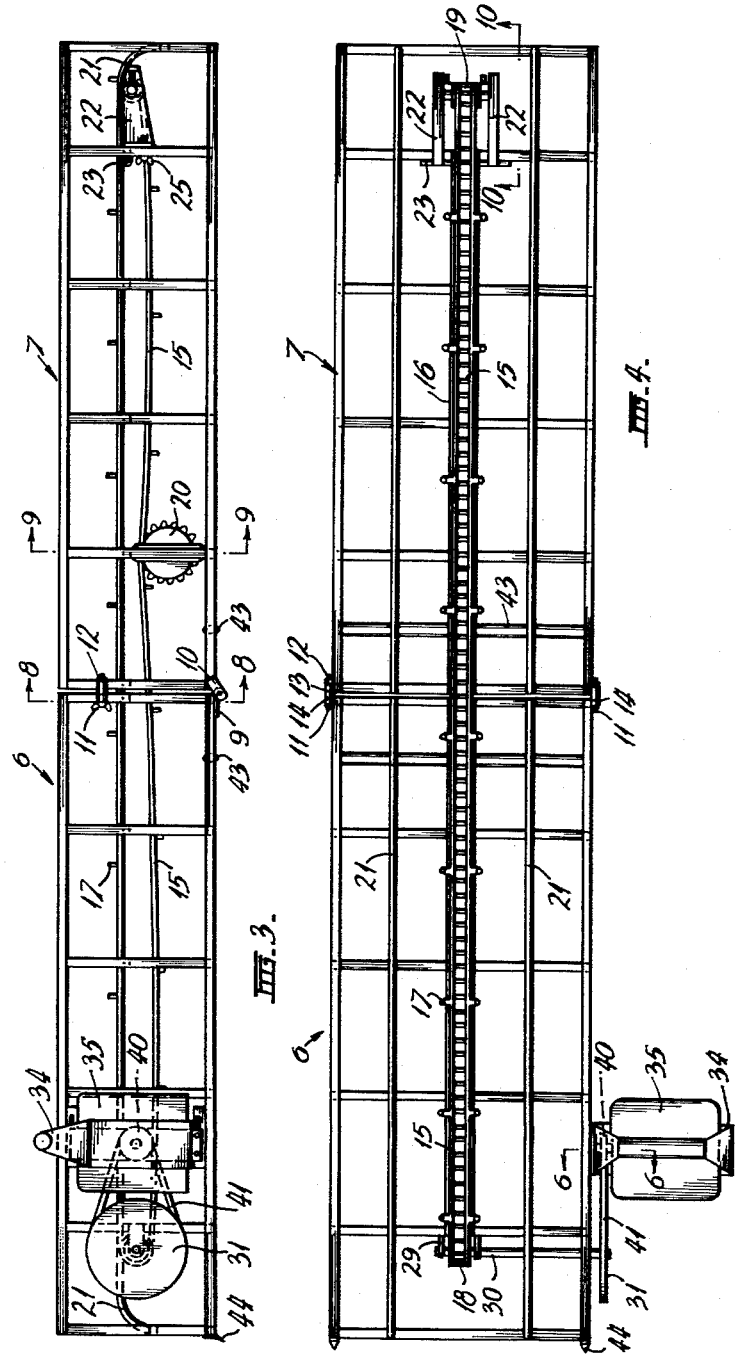

June 30, 1964  W. M. GREAVES  3,139,173
CONVEYOR ELEVATOR
Filed Aug. 20, 1962
3 Sheets-Sheet 3
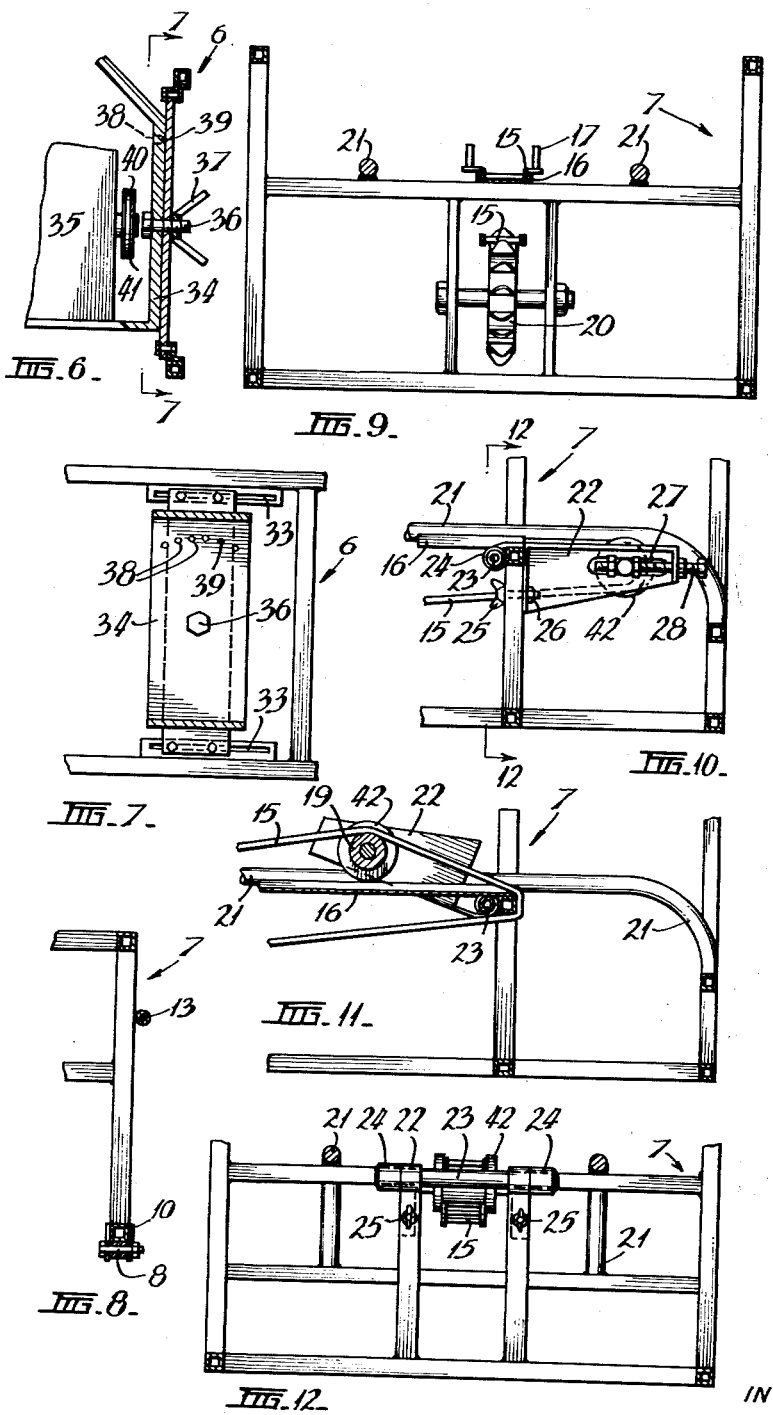
INVENTOR
WALTER MALCOLM GREAVES
BY
Warren J. Jessup ATTORNEY

United States Patent Office 3,139,173
Patented June 30, 1964

3,139,173
CONVEYOR ELEVATOR
Walter Malcolm Greaves, corner of Thompson's and Lyndhurst Roads, Lyndhurst, Victoria, Australia
Filed Aug. 20, 1962, Ser. No. 217,897
Claims priority, application Australia Aug. 29, 1961
3 Claims. (Cl. 198—113)

This invention relates to an improved conveyor elevator, and in particular relates to a portable foldable elevator of lightweight construction.

Portable elevators are known of one-piece or single-length construction for use in elevating hay bales and the like from ground to truck or truck to stack. These prior known elevators are in the main bulky, heavy and unwieldly to transport to and from the place of use. Furthermore, when elevating in confined spaces in hay sheds or barns the one-piece structure requires considerable space so that it may be manoeuvred into and out of position in the shed and allow trucks loaded with hay bales to enter the shed.

Elevators constructed from a plurality of short lengths of framework secured together by bolts or like removable fixing means are also known, and some of the disadvantages of the one-piece elevator may be overcome by dismantling and re-assembling the parts of the framework to provide ease of transporting and setting up in confined spaces. However these multiple part elevators require considerable handling in their assembly or dismantling resulting in uneconomical time consuming operations. Furthermore the problem of releasing the drive chains in dismantling these elevators usually requires breaking of the chain at a releasable link or removal of the chain from its drive sprockets, and this further adds to the disadvantages of these known multiple part elevators.

It is an object of the present invention to provide a conveyor elevator which can be folded easily and quickly from an extended elevating structure into a relatively small size for transporting, and can be manoeuvred and set up in hay barns or sheds in a relatively confined space, thus allowing greater stacking space than was hitherto possible with known one-piece heavy elevators.

It is a further object of the present invention to provide an elevator of strong lightweight construction which can be easily handled by a minimum number of hands, and transported with ease on a small truck or station sedan.

It is still a further object of the invention to provide a simple and effective chain release device on the elevator allowing ease of folding or extending the elevator framework parts.

According to one broad form of the invention there is provided a conveyor elevator comprising a multi-part framework structure, and an endless conveyor mounted in the framework the framework parts being hingedly connected for movement between a fully extended conveying position and a folded transporting or stowing position.

According to a further feature of the invention the endless conveyor comprises an endless chain having spaced transversely located upstanding pins thereon.

According to yet another feature of the invention, chain slackening or releasing means are provided on the frame structure and operable so as to permit folding of the parts of the frame structure without removing the chain from its drive and guide means. The releasing means may include a pivotally mounted end sprocket on the framework.

According to still another feature of the invention the drive means for the conveyor comprises a portable motor and drive gear adapted to be removably mounted in a mounting bracket on the framework structure so as to drivingly engage with the conveyor through belts or chains and pulleys or sprockets. The motor may be an internal combustion engine or an electric motor. The mounting bracket may include angular adjustment means for use with an internal combustion drive means to enable the engine to be mounted in a substantially horizontal plane when the elevator is operating at an angle to the horizontal.

In order that the invention and its manner of performance may be more fully described, reference will now be made to an embodiment of the invention as illustrated in the accompanying drawings wherein:

FIGURE 1 is a perspective view showing a conveyor elevator according to the invention in use elevating hay bales from a truck to a stack;

FIGURE 2 is a perspective view of the elevator in its folded transporting form on the tray of a truck with the portable drive means removed from the framework;

FIGURE 3 is a side elevational view of the elevator in its fully extended conveying form;

FIGURE 4 is a plan view from above of the elevator of FIGURE 3;

FIGURE 5 is a side elevational view of the elevator in its folded transporting or stowing form;

FIGURE 6 is a part section view of the drive motor mounting bracket and its connection to the elevator framework;

FIGURE 7 is a part section view of the mounting bracket and its attachment to the framework taken along the line 7—7 of FIGURE 6 in the direction of the arrows;

FIGURE 8 is an end elevational view in part section of the hinge connection between the framework parts taken along the line 8—8 of FIGURE 3 in the direction of the arrows;

FIGURE 9 is an end elevating view in part section through the elevator framework showing the conveyor chain in its guide channel and an idler support sprocket for the lower run of chain taken along the line 9—9 of FIGURE 3 in the direction of the arrows;

FIGURE 10 is a side view of the pivotally mounted end sprocket of the chain conveyor in its extended conveying position taken along the line 10—10 of FIGURE 4 in the direction of the arrows;

FIGURE 11 is a similar view to FIGURE 10 showing the end sprocket pivoted to its chain release position ready for folding of the framework parts, and FIGURE 12 is an end view of the pivotal mounting of the end sprocket taken along the line 12—12 of FIGURE 10 in the direction of the arrows.

Referring to the drawings, the conveyor elevator comprises a rectangular framework structure 5 of two parts, 6, 7, hingedly connected through hinge pins 8 on each side of the framework. Pins 8 are located in brackets 9 and 10 fixed to the framework parts 6 and 7 respectively.

When the parts 6, 7 are in extended conveying position, they are securely locked against movement relative to each other by bolts 11 engaging in threaded nuts 12 fixed to bushes 13 secured to side members of framework part 7. Bolts 11 pass through locating bushes 14 secured to side members of framework part 6.

Framework parts 6 and 7 are constructed from lightweight elongated members of hollow square section welded or otherwise secured together in rigid self-bracing manner.

Conveyor chain 15 is supported on its upper run in guide channel 16 and pins 17 are provided on chain 15 to act as pusher members for the articles being elevated in known manner. Chain 15 passes over a drive sprocket 18 in part 6 and an idler sprocket 19 in part 7 and is supported on its lower return run by idler sprocket 20 in part 7.

Round section rails 21 are secured to the upper transverse members of the parts 6 and 7 on each side of guide channel 16 so as to support the articles moved along the elevator by the pusher pins 17 of the chain 15 clear of chain 15, and remove any carrying load that could be imposed on the chain.

Idler sprocket 19 is mounted between bracket arms 22 pivotally mounted in part 7. Arms 22 are secured to a cross pin 23 rotatably mounted in bushes 24 secured to a transverse member of the framework.

Screw-threaded bolts 25 passing through upright framework members engage in nuts 26 fixed to arms 22 to securely locate the idler sprocket 19 and arms 22 in their extended conveying position as shown in detail in FIGURE 10.

Idler sprocket 19 is mounted for adjustment in arms 22 in known fashion through slots 27 by adjustment screw 28.

Drive sprocket 18 is mounted between brackets 29 on part 6 and is connected to shaft 30 extending to the outerside of the structure and having pulley 31 connected to its outer end.

A drive motor mounting plate 32 is secured to the framework of part 6 for longitudinal adjustment along slots 33. A supporting and carrying frame 24 for motor 35 is secured to mounting plate 32 through bolt 36 and wing nut 37. Accurately positioned apertures 38 in frame 34 engage around a projection 39 on plate 32 to locate the motor 35 at the desired angle relative to the elevator in use. If an electric motor is used projection 39 may be positioned in the middle aperture 38, but when a petrol driven engine is used it is necessary when the angle of the elevator to the horizontal increases to rotate the frame 34 around in the desired direction to a near horizontal location to prevent spilling of petrol from the engine carburettor.

Drive pulley 40 on motor 35 drives shaft 30 and sprocket 18 through belt 41 and pulley 31.

In use when it is desired to transport or stow the elevator, the motor, if it is an internal combustion engine, is removed with its frame 34 from mounting plate 32 by removing wing nut 37 from bolt 36 and pulling off frame 34 whilst ensuring that belt 41 is removed from pulley 40 or 31 or both.

Bolts 25 are then removed from nuts 26 on arms 22 and arms 22 together with idler sprocket 19 and its adjustment screw 28 are swung around to the position shown in FIGURE 11 wherein discs 42 on each side of idler sprocket 19 engage against guide channel 16 and prevent further rotation of arms 22. Chain 15 is now slackened sufficiently to allow parts 6 and 7 to be folded to the form shown in FIGURE 5.

Bolts 11 are now removed and part 7 is swung under part 6 and chain 15 assumes the path shown in FIGURE 5. It will be noted that the chain 15 engages against bars 43 located in the frame parts to prevent excessive release or slackening of the chain and obviate displacement of the chain from the sprockets.

The folded elevator may now be easily and conveniently moved and stored in a relatively small space. By forming the framework of hollow section members a strong lightweight construction is provided.

To prevent movement of the elevator in use, spike members 44 are provided at the outer end of part 6.

What I claim is:
1. A conveyor implement, comprising:
   a multi-section framework structure having an extended end-to-end service relationship, and a hinged interconnection providing a folded storage relationship, said framework folding along a longitudinal axial plane;
   an annular flexible drive member extending axially of said extended framework and operating in said axial plane;
   at least a first and second guide means for directing said drive member in an annular path with one portion of said path positioned with respect to said framework for conveying objects therealong;
   at least one of said guide means having an end providing a return path for said drive member annular path;
   means for adjusting the position of said end to produce a usefully taut condition of said drive member when said framework is in said service relationship;
   a mount device pivotally carried by one section of said framework at the end thereof, said guide means having the end surface and the adjustment means therefore mounted on said mount device, said mount device swingable along said axial plane from a service position wherein the distance between said first and second guide means is maximum to a release position wherein said distance is reduced, the difference in said distances being directly related to the difference in the distance of the path of said drive member in the service relationship and storage relationship positions of said framework structure.

2. In the structure defined in claim 1, said framework structure providing a burden supporting surface means, said first guide means being a power driven sprocket;
   a slack supporting sprocket on the return run substantially midway of the extending implement; and
   said end guide means being a sprocket with a swingable mount extending the sprocket a maximum distance from the drive sprocket in order to hold the flexible drive reasonably taut, and swingable toward the drive sprocket to provide sufficient slack that the frame may be folded and the slack provided by change of the end sprocket member will provide sufficient extra length of the flexible drive member to permit the framework structure to be bolted into a side-by-side relationship.

3. In the conveyor implement defined in claim 1, the means for adjusting the position of the end surface being a non-resilient device providing a fixed retention of the position to which it is adjusted in order that the position will not change under load conditions.

References Cited in the file of this patent
UNITED STATES PATENTS

| | | |
|---|---|---|
| 1,110,419 | Carpenter | Sept. 15, 1914 |
| 2,560,823 | Roscoe | July 17, 1951 |
| 2,768,731 | Anderson | Oct. 30, 1956 |